United States Patent

[11] 3,556,550

| [72] | Inventor | Enzo Franchini<br>Turin, Italy |
|---|---|---|
| [21] | Appl. No. | 755,572 |
| [22] | Filed | Aug. 27, 1968 |
| [45] | Patented | Jan. 19, 1971 |
| [73] | Assignee | Fiat Societa per Azioni<br>Turin, Italy<br>an Italian Joint Stock Company. |
| [32] | Priority | Sept. 5, 1967 |
| [33] | | Italy |
| [31] | | No. 52,925A/67<br>Pat. 813,495 |

[54] STEERING GEAR FOR MOTOR VEHICLES
5 Claims, 5 Drawing Figs.

[52] U.S. Cl. .................................................. 280/87,
280/150, 74/493
[51] Int. Cl. ...................................................... B62d 1/18
[50] Field of Search ............................................. 280/150,
87; 180/82, 90, 78, 77; 74/492—494, 554, 558

[56] References Cited
UNITED STATES PATENTS

| 2,088,146 | 7/1937 | Walker | 74/492 |
|---|---|---|---|
| 2,327,931 | 8/1943 | Ratner | (74/558UX) |
| 2,855,216 | 10/1958 | Sacks | 280/150 |
| 2,946,869 | 7/1960 | Parks et al. | (74/558UX) |
| 3,028,766 | 4/1962 | Musilli | 74/493X |
| 3,058,367 | 10/1962 | Hoffman | 74/493 |
| 3,189,367 | 6/1965 | Glass | 280/150 |
| 3,329,040 | 7/1967 | Stein | 74/492X |
| 3,341,248 | 9/1967 | Barenyi et al. | 180/90X |
| 3,424,263 | 1/1969 | Black | 74/492X |
| 3,439,769 | 4/1969 | Brilmyer | 180/90 |

*Primary Examiner*—Kenneth H. Betts
*Attorney*—Sughrue, Rothwell, Mion, Zinn and Macpeak ABSTRACT: A safety steering gear has at least the rearward portion of the steering shaft deformable about a horizontal transverse axis to assume a vertical position under frontal impact forces. The steering wheel attached to this shaft is also rotatable about a horizontal transverse axis and rotates in the opposite sense to the rearward shaft portion so as to assume a flat near-vertical position with its rim collapsed against the rear shaft portion after impact. The attachment of the steering wheel to the shaft may comprise a universal joint, surrounded by a collapsible sleeve that collapses on frontal impact. The underside of a guide member in which the shaft is mounted near the wheel pivots upwardly on a frontal impact and is padded to prevent injury to the driver's chest. There may be a yieldable and telescopic joint in the forward portion of the shaft.

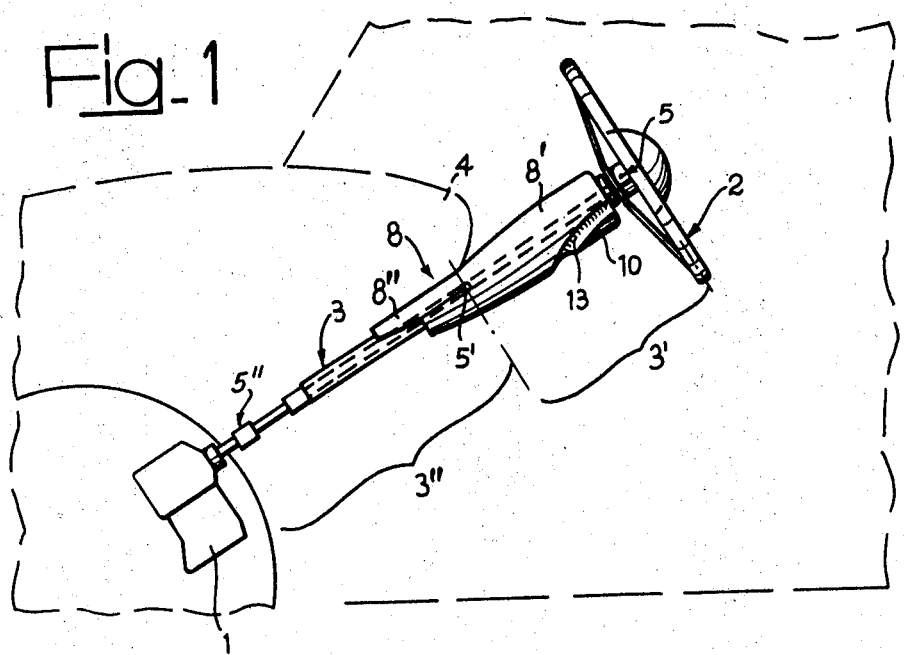
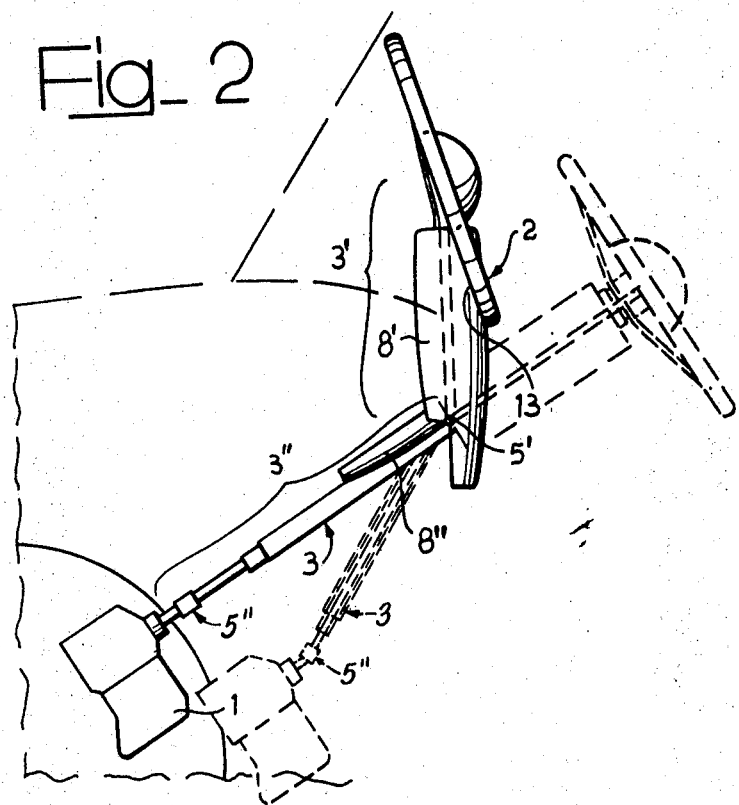

//3,556,550

STEERING GEAR FOR MOTOR VEHICLES

This invention relates to steering gear for motor vehicles.

Steering gear as conventionally known comprises a steering box operating the steerable wheels of a vehicle and controlled by a steering wheel connected to the mechanical components of the steering box by a shaft which is inclined to the horizontal, means being provided for guiding and supporting the shaft, said means generally comprising a tubular sheath enclosing at least part of the steering shaft and connected to a fixed point of the vehicle body, usually the instrument board.

As is well known, upon frontal impact or collisions of a vehicle, the driver of the vehicle is liable to injuries due to the transmission of forces acting on the forward end of the vehicle rearwardly to the passenger compartment. In addition, the inertia of the driver carries the driver forwardly onto the rim and hub of the steering wheel. These effects combined often lead to fatal injuries.

An object of the present invention is to obviate the above drawbacks by providing a steering gear for motor vehicles of the above-mentioned type, such that upon frontal impact the extent of injury caused to a driver by the steering wheel is reduced.

A further object of the invention is to provide a steering gear of the above-mentioned type which protects both the chest and face of the driver in the event of a frontal impact, so that for a given force of impact the deceleration of the driver does not exceed a predetermined magnitude.

A further object of the invention is to provide a steering gear of the above-mentioned type, which is simple and inexpensive in construction, sturdy and easily assemblable.

The invention will be understood from the following detailed description, given by way of example only, with reference to the accompanying drawings, wherein:

FIG. 1 is a diagrammatic side elevational view of a steering gear for motor vehicles according to the invention, shown in its normal operative position;

FIG. 2 is a diagrammatic side elevational view of the steering gear of FIG. 1 as deformed upon the occurence of a frontal impact on the vehicle;

Figure 3:
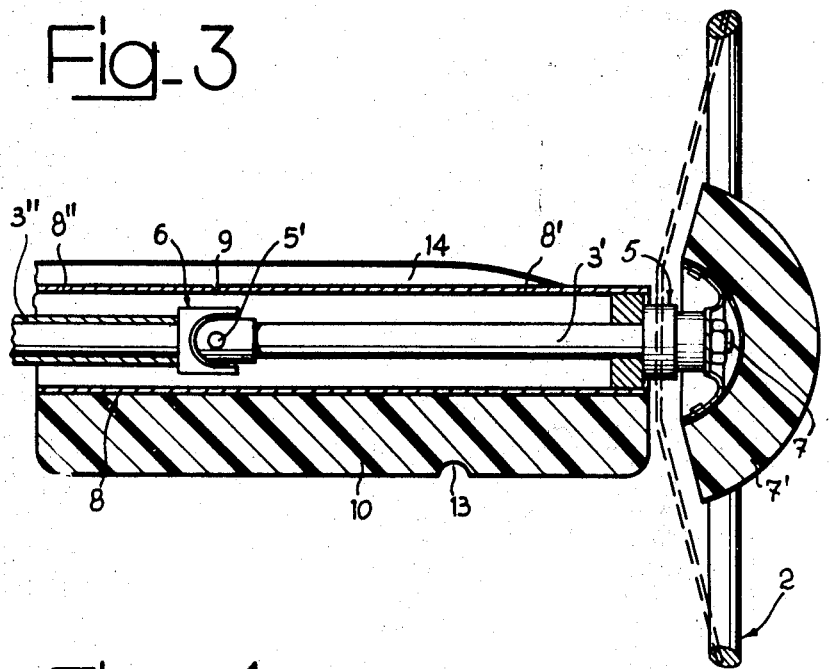
FIG. 3 is a diagrammatic axial sectional view on an enlarged scale showing the rearward part of the steering gear according to a preferred embodiment.

The steering gear according to the invention comprises a steering box 1 operating the steerable wheels (not shown) of a motor vehicle and a steering wheel 2 connected to the steering box by a steering shaft 3 which is inclined to the horizontal. The shaft 3 is enclosed in part by guide means in the form of a sheath 8 secured to an instrument board 4 in the driver's compartment of the vehicle.

The steering shaft 3 is subdivided into rearward and forward portions 3', 3" extending from the instrument board 4 to the steering wheel 2 and to the steering box 1, respectively.

The two shaft portions 3', 3" are interconnected by a yieldable joint 5' provided at the connection of the sheath 8 to the instrument board 4 and permitting rotation of the rearward portion 3' bout a horizontal transverse axis. In addition, the steering wheel 2 has a yieldable attachment to the rearward portion 3', comprising in this embodiment a joint 5 similar to the joint 5' and permitting rotation of the steering wheel 2 relative to the shaft portion 3' about a horizontal transverse axis in the opposite sense to the rotation of the portion 3' at the joint 5'. Means are further provided for permitting a rear portion 8' of the outer sheath 8 to rotate upon a frontal impact about the transverse axis of the joint 5' together with the rearward shaft portion 3', so that the two portions 3' and 8' may assume a substantially vertical position (FIG. 2) after a frontal impact. At the same time the steering wheel 2 rotates in an opposite direction about the axis of the joint 5, until it is acutely inclined with respect to the rearward shaft portion 3', the lower part of the steering wheel rim engaging the lower surface of the rear portion 8' of the sheath 8. In this way, the steering wheel 2 and the rear sheath portion 8' form in effect a protective shield against which the chest and face of the driver bear in the event of a frontal impact.

The joint 5' in the embodiment of FIG. 3 comprises a universal or cardan joint 6 between the two shaft portions 3', 3". The yieldable steering wheel attachment comprises a yieldable connection 5, which may be the same as or similar to the joint 6' shown in FIG. 5, between the steering wheel hub and the upper end of the rearward shaft portion 3', said connection 5 permitting rotation of the steering wheel 2 about a horizontal transverse axis to take up the above-mentioned inclined position.

The steering wheel 2 has a hub 7 provided with highly deformable padding 7' of yieldable material of part spherical or part ellipsoidal shape.

The provision of the hub padding 7' on the steering wheel hub 7 permits the hub 7 to act as an effective facial shield, irrespective of the steered condition of the steering wheel 2 upon impact.

The steering wheel 2 may moreover be provided with padded spokes and a padded rim to provide additional facial protection for the driver upon impact.

Figure 5:
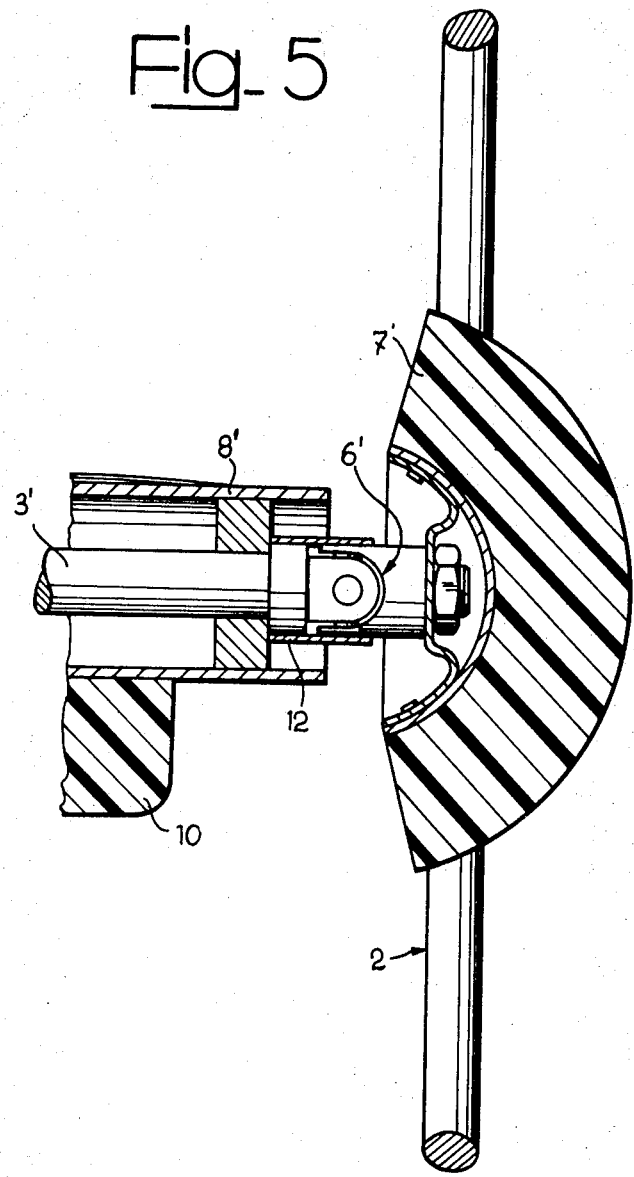
FIG. 5 is a diagrammatic axial sectional view on an enlarged scale of an embodiment of the structure shown in FIG. 3.

As shown in FIG. 5, the yieldable steering wheel connection may comprise a universal joint 6' which is normally held inoperative by a collapsible sleeve 12 surrounding the joint 6'. The sleeve 12 is deformed or breaks in the event of a frontal impact to permit the above-mentioned rotation of the steering wheel 2 about said horizontal transverse axis.

Figure 4:
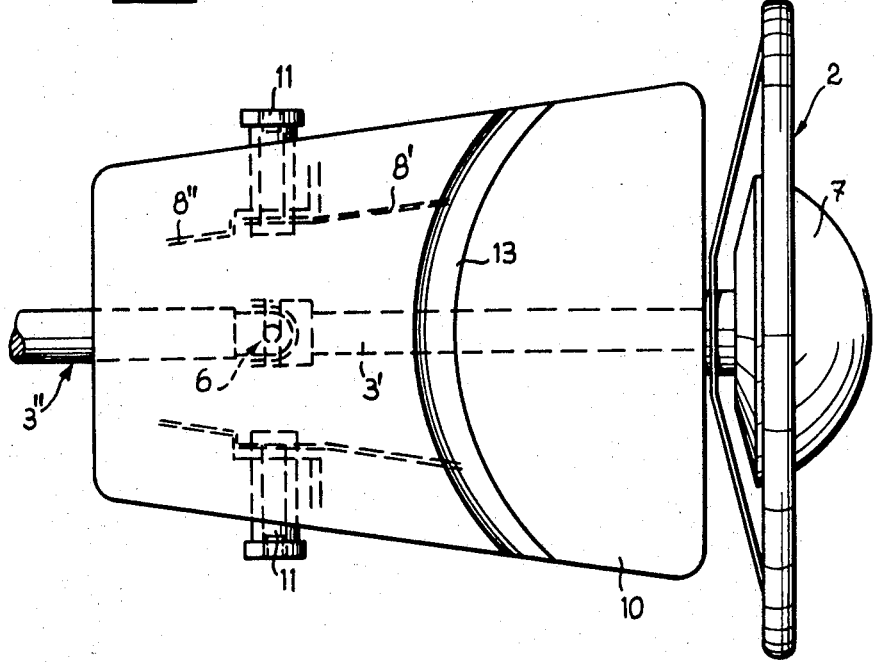
FIG. 4 is a view from below of the part shown in FIG. 3.

Similarly, the outer sheath 8 is also made deformable by providing transverse hinges 11 therein, as shown in FIG. 4, the rotational axis of which coincides with the axis of the joint 5' for the rearward shaft portion 3'. Alternatively, the sheath 8 may be weakened by providing transversely extending collapsible zones 9, FIG. 3, at which the sheath 8 is deformed or breaks in order to permit the rear sheath portion 8' to take up said vertical position upon the occurrence of a frontal impact.

The rearward shaft portion 3' may be rendered deformable by other methods, such as by providing weakened portions of a reduced bending resistance, for example through the interposition of collapsible sleeves interconnecting adjacent shaft lengths and collapsible in response to the shock of a frontal impact. Such weakened portions can also be formed by regions of reduced cross section in the shaft 3.

The lower side of the forward sheath portion 8' is provided with upholstered padding 10 extending over a wide surface and forming the said protective shield on which the driver's chest bears upon frontal impact. This upholstered padding 10 is formed with arcuate groove 13 for accommodating the lower part of the steering wheel rim which, in its collapsed state (FIG. 2) lies on padding 10.

In order to further improve the safety of the steering gear, the forward shaft portion 3" should preferably be made deformable, as provided in applicant's copending application Ser. No. 755,571, filed on an even date with the present application. Thus the said forward shaft portion 3" is provided with a further yieldable joint 5" (FIG. 1) at its end adjacent the steering box 1, as well as with means permitting reduction in length of the shaft portion 3" under frontal impact loads. By this means the rear portions 8' and 3' of the sheath 8 and steering shaft 3 respectively, as well as the steering wheel 2 and the forward shaft portion 3", become deformed upon frontal impact, the forward shaft portion 3" also becoming shortened upon frontal impact.

The steering gear of the invention is particularly useful with an upholstered instrument board capable of dissipating the kinetic energy of the driver's body upon impact of the latter therewith. alternatively, an instrument board and frame therefor may include predetermined collapsible regions arranged in accordance with the amount of kinetic energy to be dissipated. Additional dampers may moreover be provided, such as spring dissipating means, spring lugs, springs, metal bellows and fluid shock absorbers for absorbing the kinetic energy of a driver without allowing the deceleration of the driver to exceed a predetermined limit.

The upper surface region 14 of the sheath portion 8' opposite the upholstered padding 10 may be adapted to receive the controls which are normally mounted on the steering column or instrument board. Such controls, by being so mounted, are automatically disposed on the side opposite to that contacted by the driver's body when upward rotation of the sheath portion 8' occurs on impact.

I claim:
1. Steering gear for a motor vehicle comprising:
 a. a steering box,
 b. a shaft connected to the steering box,
 c. a steering wheel mounted on the end of the shaft remote from the steering box,
 d. guide means supporting the shaft for rotation about its axis,
 e. mounting means for securing the guide means to a fixed point of the vehicle body,
 f. a yieldable joint in said shaft permitting rotation of a rearward portion of the shaft about an axis transverse to the axis of the shaft in response to a forward force on the steering wheel due to frontal impact,
 g. a yieldable attachment connecting the steering wheel to the shaft and permitting rotation of the steering wheel relative to the shaft about an axis parallel to the said transverse axis and in the opposite sense to the rotation of the rearward shaft portion in response to a said forward force, the yieldable joint and the yieldable attachment comprising universal joints, the yieldable attachment including a collapsible sleeve surrounding the universal joint to render the joint normally inoperative, the sleeve being collapsible in response to a frontal impact.

2. Steering gear for a motor vehicle comprising:
 a. a steering box,
 b. a shaft connected to the steering box,
 c. a steering wheel mounted on the end of the shaft remote from the steering box,
 d. guide means supporting the shaft for rotation about its axis,
 e. mounting means for securing the guide means to a fixed point of the vehicle body,
 f. a yieldable joint in said shaft permitting rotation of a rearward portion of the shaft about an axis transverse to the axis of the shaft in response to a forward force on the steering wheel due to frontal impact,
 g. a yieldable attachment connecting the steering wheel to the shaft and permitting rotation of the steering wheel relative to the shaft about an axis parallel to the said transverse axis and in the opposite sense to the rotation of the rearward shaft portion in response to a said forward force, the guide means comprising an outer sheath surrounding at least the rearward portion of the shaft and provided on its lower side with padding forming a shock absorbing protective shield for the driver's body.

3. Steering gear as claimed in claim 2, wherein the padding is formed with a groove accommodating part of the rim of the steering wheel upon rotation of the latter about said transverse axis.

4. Steering gear for a motor vehicle having an instrument board, comprising:
 a. a steering box,
 b. a shaft connected to the steering box,
 c. a steering wheel mounted on the end of the shaft remote from the steering box,
 d. guide means supporting the shaft for rotation about its axis,
 e. mounting means for securing the guide means at a fixed point thereon to a fixed point on the instrument board of the vehicle,
 f. a first yieldable joint in the shaft permitting rotation of a rearward portion of the shaft connected to the steering wheel about a generally horizontal axis transverse to the axis of the shaft in response to a forward force on the steering wheel due to frontal impact,
 g. a yieldable attachment connecting the steering wheel to the shaft and permitting rotation of the steering wheel relative to the shaft about an axis parallel to said transverse axis and in the opposite sense to the rotation of the rearward shaft portion in response to a forward force,
 h. a second yieldable joint in a forward portion of the shaft connected to the steering box to permit rotation of the forward portion of the shaft about an axis parallel to said transverse axis, and
 i. a telescopic joint in the forward portion of the shaft rearwardly of the yieldable joint therein, the telescopic joint permitting reduction of the length of the forward portion of the shaft upon frontal impact.

5. Steering gear as claimed in claim 4 wherein the guide means comprises an outer sheath surrounding at least the rearward portion of the shaft and is provided on its lower side with padding forming a shock absorbent protective shield for the driver's body.